United States Patent [19]

Muessig

[11] 4,186,722
[45] Feb. 5, 1980

[54] SOLAR ENERGY COLLECTOR

[75] Inventor: Charles E. Muessig, Imlay City, Mich.

[73] Assignee: International Solar Technologies, Inc., Bainbridge, Ind.

[21] Appl. No.: 791,274

[22] Filed: Apr. 27, 1977

[51] Int. Cl.$^2$ ............................................. F24J 3/02
[52] U.S. Cl. ....................................126/428; 126/400
[58] Field of Search ................... 126/270, 271, 400; 237/1 A; 165/179–181; 29/157.3 A, 157.3 B

[56] References Cited

U.S. PATENT DOCUMENTS

| | | | |
|---|---|---|---|
| 2,931,578 | 4/1960 | Thompson | 126/270 X |
| 3,863,621 | 2/1975 | Schoenfelder | 237/1 A |
| 3,987,786 | 10/1976 | Keyes et al. | 126/270 X |
| 4,034,736 | 7/1977 | Telkes | 237/1 A |
| 4,050,443 | 9/1977 | Peck et al. | 237/1 A X |
| 4,059,226 | 11/1977 | Atkinson | 237/1 A |
| 4,064,868 | 12/1977 | Nussbaum | 126/271 |

Primary Examiner—Samuel Scott
Assistant Examiner—Larry Jones
Attorney, Agent, or Firm—Cullen, Sloman, Cantor, Grauer, Scott & Rutherford

[57] ABSTRACT

A solar energy collecting and storing unit comprises a single housing having a glass-covered collector chamber on one face of a gravel-filled heat storage chamber, the chambers being separated by an insulated partition. The collector comprises an array of L-shaped metal fins over which air is caused to flow in a predetermined path by baffles. A first air flow circuit between the storage chamber and the collector chamber picks up heat absorbed by the fins and transfers it to gravel in the heat storage chamber. A second air flow circuit transfers heat from the storage chamber to the building to be heated.

4 Claims, 4 Drawing Figures

U.S. Patent
Feb. 5, 1980
4,186,722
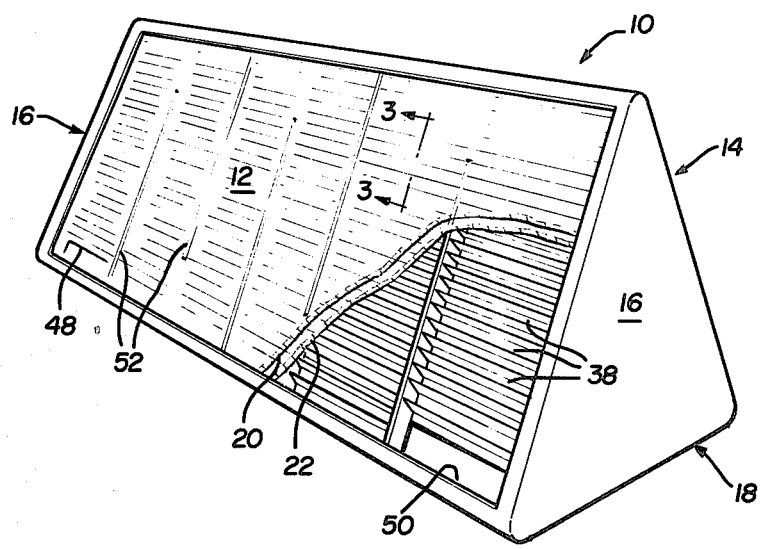
FIG. 1
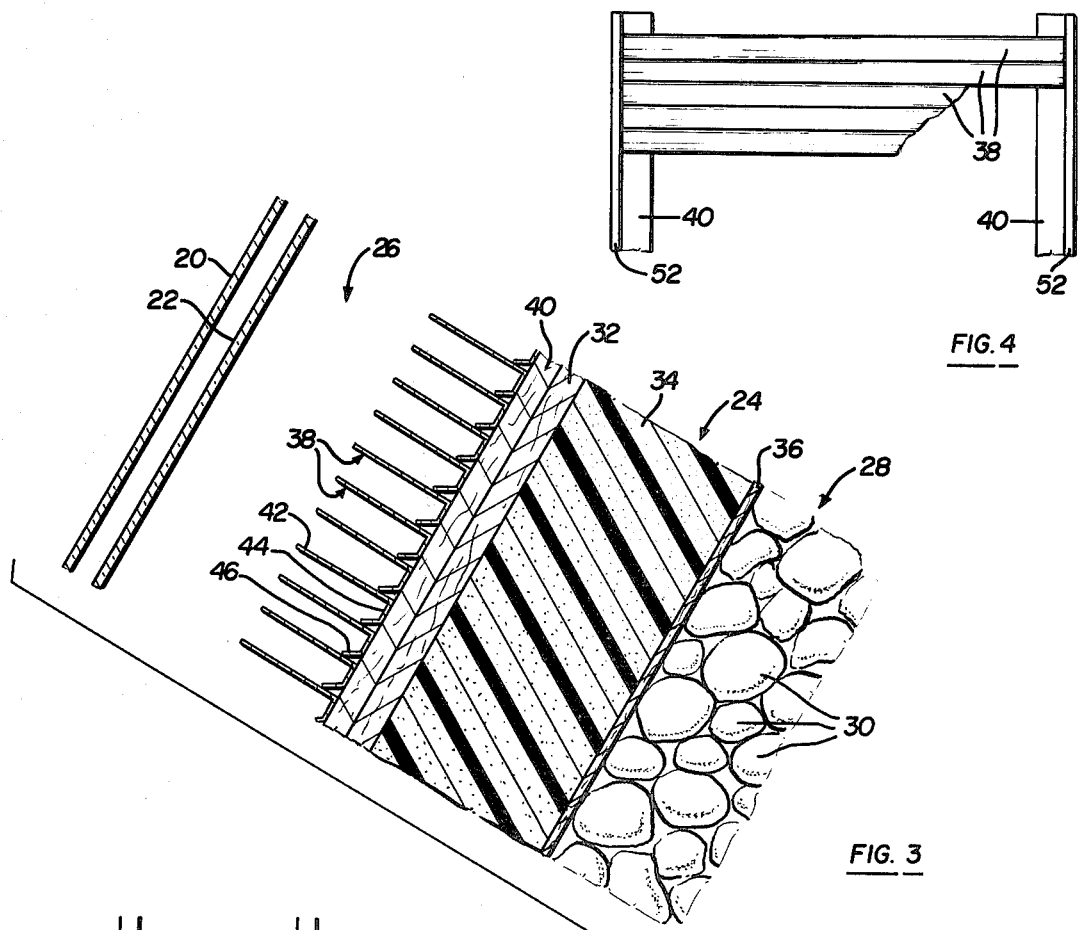
FIG. 4
FIG. 3
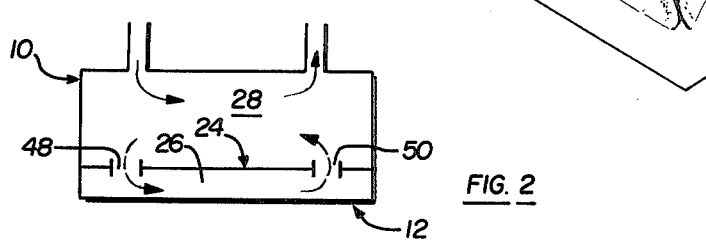
FIG. 2

4,186,722

SOLAR ENERGY COLLECTOR

BACKGROUND OF INVENTION

The recognition of dwindling energy reserves in the face of the increasing energy demands has focused considerable research and development effort on the sun as a source of energy. Numerous systems for collecting and storing solar energy have been designed, particularly in recent years.

A compact self-contained solar energy collecting and storage unit of the type disclosed in U.S. Pat. No. 3,946,720 has been built by the assignee of the present invention. Experience in the construction and use of such solar furnaces has revealed the desirability for even more economical solar energy absorbing means than the metal cups disclosed in such patent. Such metal cups are relatively costly to manufacture. Because the cups enclose a lot of air, they consume a lot of space during shipment from the cup-fabricating point to the solar furnace assembly point. Furthermore, the material cost of a cup-type collector system is increased by the use of an additional metallic heat absorbing backing plate behind the array of cups.

Accordingly, it is the principal object of the present invention to provide an improved solar energy absorbing system suitable for use in a low-cost type of solar furnace.

The most pertinent prior art known to applicant includes the device disclosed in the aforementioned 3,946,720 patent, the fins disclosed in U.S. Pat. Nos. 2,931,578 and 3,089,670, and the baffle arrangements in U.S. Pat. Nos. 2,680,437 and 3,902,474. Neither of the fins of the 2,931,578 and 3,089,670 patent disclosures utilize the integral backing plate disclosed herein, with its fabrication and mounting advantages, nor are such prior art fins oriented relative to the air flow as disclosed and claimed herein.

SUMMARY OF INVENTION

The solar energy collector of the present invention uses an array of parallel elongated metal fins having an L-shaped cross section, and arranged perpendicularly to a system of air flow-directing baffles, so that the air flow passes perpendicularly across such fins. The fins are secured to mounting strips which space them from the back wall of the collector, thereby permitting air flow to pass over all of the surfaces of the fin for maximum transfer of heat from the fins to the air. The simple L-shape of the fins is easy to fabricate and lends itself to stacking to provide maximum use of shipping volume. One leg of the L simultaneously serves as an integral backing plate. A short flange on the base leg provides automatic spacing of the fins, and the fins can be readily fastened in place by a stapling gun.

BRIEF DESCRIPTION OF THE DRAWINGS

FIG. 1 is a perspective view of a solar furnace made in accordance with the present invention.

FIG. 2 is a schematic diagram of the air flow through the solar furnace.

FIG. 3 is a cross-section through the collector chamber, viewed in the direction of arrows 3—3 of FIG. 1.

FIG. 4 is a fragmentary front view of a portion of the collector chamber.

DETAILED DESCRIPTION OF THE INVENTION

The improved solar energy collector of the present invention is particularly well adapted for use in a low-cost solar furnace of the type disclosed in U.S. Pat. No. 3,946,720. The structural and functional details which are not necessary to an understanding of how to make and use the improved collector disclosed herein are more fully described in such prior patent.

Referring particularly to FIGS. 1 and 2, the solar furnace 10 has a triangular cross-section, comprising a front wall 12, back wall 14, end walls 16 and floor 18. One embodiment which has been manufactured by applicant's assignee has a front wall eight feet high by twelve feet long. Front wall 12 is intended to be oriented toward the south, and comprises two panes of glass 20, 22 having an insulated air space therebetween. sThe back and end walls, as well as the floor of furnace 10, must be well insulated in order to retain the energy which is absorbed from the sun. A construction which has proved economical and efficient in this regard consists of four inches of urethane foam faced on the outside with an aluminum panel and on the inside with a laminated paper or cardboard type of product known as Shepherd board manufactured by Shepherd Products of Kalamazoo, Mich. This board has been utilized in a 0.080 inch thickness, with its inner face covered with a heat-reflective aluminum foil having a thickness of 0.0035 inches.

As best shown in FIG. 3, an insulated partition 24 separates the collection chamber 26 located immediately inside the glass front wall 12 from storage chamber 28 which fills the remainder of furnace 10. The heat storing medium within chamber 28 is preferably ¾ inch to 1½ inch washed and screened river gravel 30. Partition 24 comprises a ½ inch thick plywood sheet 32 covering the outer face of a 4-inch thick layer of urethane foam 34, the inner face of which is covered with the Shepherd board 36, as described above.

Solar energy absorbing fins 38 are fastened as by staples to ½-inch thick wood strips 40, best shown in FIGS. 1, 3 and 4, these strips functioning to space fins 38 off of panel 32, thereby defining an air space through which air can flow to pick up heat off the back side of the fins. Each of fins 38 comprises an upstanding leg 42, a base leg 44 (through which the fin is stapled to strip 40) and a short spacer flange 46 which is at an obtuse angle relative to base leg 44 to facilitate stacking of the fins during shipment. Flange 46 acts as a fin locator when the fin is abutted against an adjacent fin during installation. If desired, the fins can be reversed so that each base leg 44 extends up the inclined face of strip 40 rather than downward, as shown.

One set of collection chamber specifications which has worked successfully employs two sheets of 3/16-inch glass having a ¾-inch air space therebetween, with inner glass sheet 22 being spaced about 5¾ inches above panel 32. The aluminum fins 38 are about 23 inches long and are fabricated of 0.019 inch stock, and leg 42 is about 2¼ inches long and leg 44 about ¾ inch wide. The fins are preferably black to provide maximum heat absorption.

As shown in FIG. 1, collection chamber 26 has an air inlet port 48 in the lower left corner and an air outlet port 50 in the lower right corner. A system of parallel vertical baffles 52 subdivide collection chamber 26 in such a way as to channel the air flow in a serpentine path between inlet port 48 and outlet port 50, thereby assuring that all of the air flow contacts all of fins 38. The baffles are mounted on panel 32, and preferably bridge the gap between such channel and the underface of inner glass panel 22. Thus, the glass can be supported intermediate its edges upon the upper edges of baffles 52.

As will be best understood by reference to FIGS. 1 and 2, two separate air flow circuits are utilized in the furnace of this invention, each operated by its own blower and thermostat, as more fully described in the aforementioned U.S. Pat. No. 3,946,720. When a sufficient amount of solar energy falls upon furnace 10, sensors establish a first air flow path, causing air to flow from storage chamber 28 through air inlet port 48 into collection chamber 26. This air flow then passes across the full array of fins, as controlled by baffles 52, swirling down into the space between adjacent fins to scrub the heat off the fin surfaces. The spacing of fins 38 from panel 32 by strips 40 allows air to flow along the underside of base legs 44 and to pick up heat therefrom. This air flow can mix with the upper flow via gaps which exist between adjacent fins where contact is not continuous. If desired, the air flow beneath the fins may be enhanced by appropriate interruption or shifting of strips 40 in the areas beyond the ends of baffles 52, to facilitate movement of this lower air current from one leg of the serpentine path to the next, as will be understood by those skilled in the art. Thus, these upper and lower components of the air flow scrub the heat off of all surfaces of each fin, providing maximum transfer of heat from the fins to the air stream.

After the air flow has traversed all of collection chamber 26, it exits through outlet port 50, from which it flows through the gravel storage media 30 to surrender its heat. Appropriate baffles, not illustrated, assure that this air flow heats the entire storage chamber, before again exiting from the storage chamber through inlet port 48 back out to the collection chamber 26.

When the residence or other structure to be heated by furnace 10 call for heat, a second blower system establishes an air flow path from the dwelling to storage chamber 16, where the air picks up the heat stored in the gravel, and carries it to the dwelling. For maximum efficiency, the direction of this air flow through storage 28 is counter to the direction of the first air flow circuit described above. Appropriate baffles and/or dampers can be utilized to prevent short circuiting of these air flows, as more fully described in the aforementioned patent. Such details, not forming a part of the present invention in the improved solar energy collecting means, are not described herein.

Thus, the collector construction disclosed herein substantially improves the economy and ease of fin fabrication and installation, while increasing the fin to air contact area as a result of the spacing of the base leg of the fin from the back wall.

This invention may be further developed within the scope of the following claims. Accordingly, the above specification is to be interpreted as illustrative of only a single operative embodiment of this invention, rather than in a strictly limited sense.

I now claim:

1. In a solar energy collecting and storing unit utilizing a heat collecting chamber defined by a front transparent sheet through which solar energy may enter, a thermally insulated back wall substantially parallel to the front sheet, and thermally insulated side walls completing the enclosure of the chamber, an inlet port through which air to be heated may be admitted to the chamber, an outlet port through which heated air may leave the chamber, and a system of baffles substantially bridging the space between the front sheet and the back wall and defining a predetermined path for air traversing the chamber between the inlet and outlet ports, the improved solar energy absorbing means which comprises:

a plurality of elongated sheet metal fins, each fin having a generally L-shaped cross section defined by a first leg lying in a plane substantially parallel to the back wall and a second leg extending substantially perpendicularly away from its intersection with said first leg and toward the front sheet but with the free end of said second leg terminating at a point spaced from the front sheet to define an air flow channel between said free ends and the front sheet, both legs of said fins being darkened to provide maximum absorption of solar energy;

said fins and the baffles being mounted within said chamber so that said free ends of said fins extend perpendicularly to the direction of air flow along the predetermined path and through said channel.

2. The solar energy collector of claim 1 wherein said fins are mounted within the chamber in a manner which leaves substantially the full area of all four faces of each fin exposed to the air flow along the predetermined path.

3. The solar energy collector of claim 1 wherein said first leg of each fin has a short flange along the edge remote from the intersection with said second leg, said flange acting as a fin locator during assembly when the free edge of said flange of each fin is abutted against the second leg of a parallel adjacent fin.

4. In a solar energy collecting and storing unit utilizing a heat collecting chamber defined by a front transparent sheet through which solar energy may enter, a thermally insulated back wall substantially parallel to the front sheet, and thermally insulated side walls completing the enclosure of the chamber, an inlet port through which air to be heated may be admitted to the chamber, an outlet port through which heated air may leave the chamber, and a system of baffles substantially bridging the space between the front sheet and the back wall and defining a predetermined path for air traversing the chamber between the inlet and outlet ports, the improved solar energy absorbing means which comprises:

a plurality of elongated sheet metal fins, each fin having a generally L-shaped cross section defined by a first leg lying in a plane substantially parallel to the back wall and a second leg extending substantially perpendicularly away from its intersection with said first leg and toward the front sheet but with the free end of said second leg terminating at a point spaced from the front sheet to define an air flow channel between said free ends and the front sheet, both legs of said fins being darkened to provide maximum absorption of solar energy;

the baffles being mounted on the back wall and arranged parallel to each other in such a way that the predetermined air flow path is a single serpentine path traversing substantially the full area of the chamber;

a plurality of mounting strips extending parallel to the baffles and mounted within the chamber on the back wall, said fins being secured to said mounting strips with their lengths extending in a direction perpendicular to the mounting strips and baffles, said mounting strips spacing said fins from the back wall to allow air flow around all surfaces of said fins;

whereby the air flowing along the predetermined path parallel to and between the baffles flows in two parallel planes, one plane lying between said first legs of said fins and the back wall, and the second coinciding with said air flow channel, the air flow in said air flow channel also swirling down into the spaces between the second legs of said fins to remove heat therefrom and from the surface of said first legs facing the front sheet.

* * * * *